Jan. 17, 1956  G. C. HUGHES  2,731,032
FLUID PRESSURE REGULATING SYSTEM
Filed Aug. 7, 1952  3 Sheets-Sheet 1
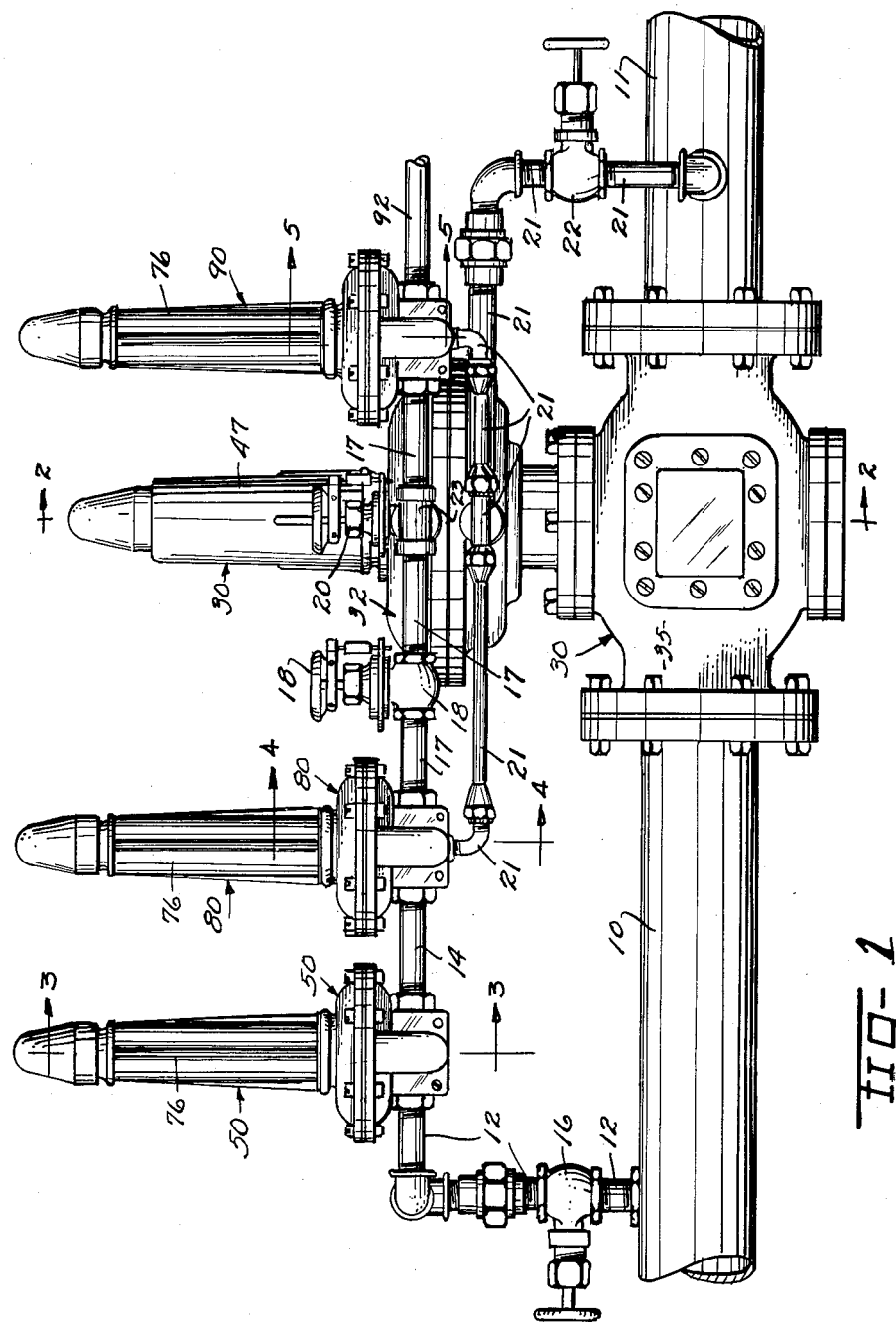
INVENTOR.
GEORGE C. HUGHES
BY
Bates, Teare, v McBean
ATTORNEYS Jan. 17, 1956 G. C. HUGHES 2,731,032
FLUID PRESSURE REGULATING SYSTEM
Filed Aug. 7, 1952 3 Sheets-Sheet 2
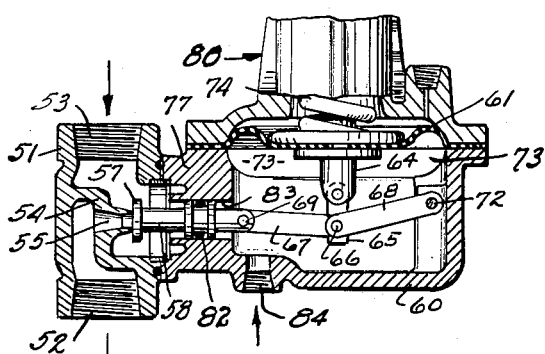
Fig-4
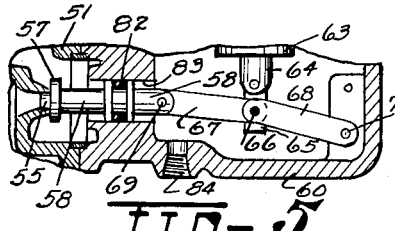
Fig-5
Fig-3
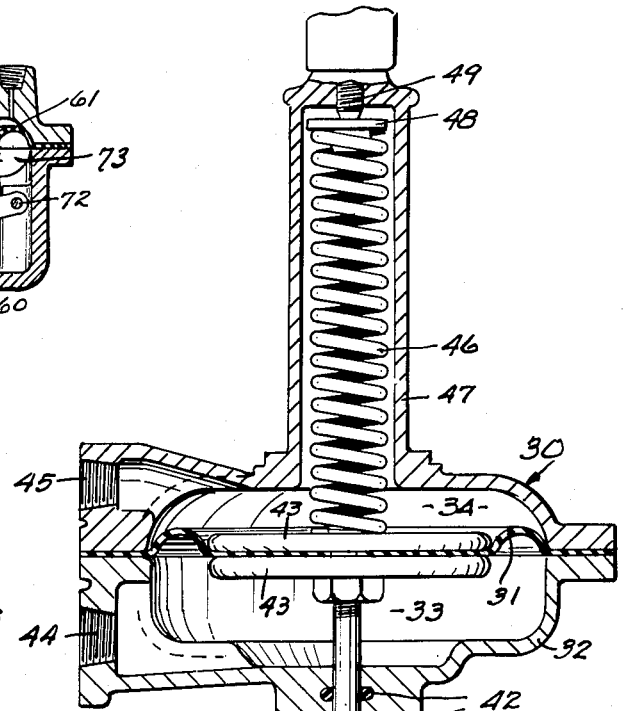
Fig-2
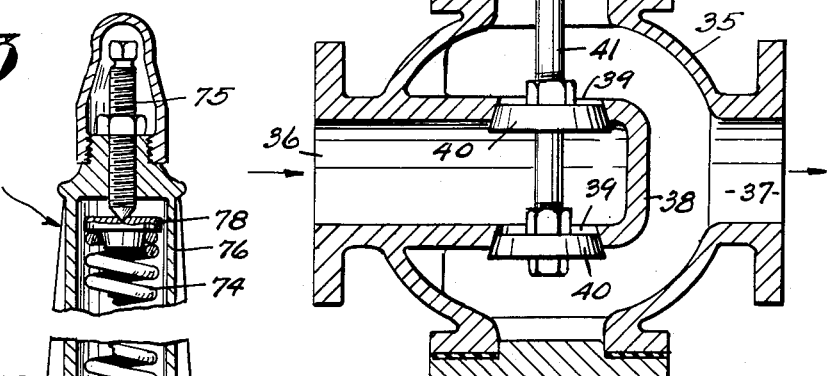
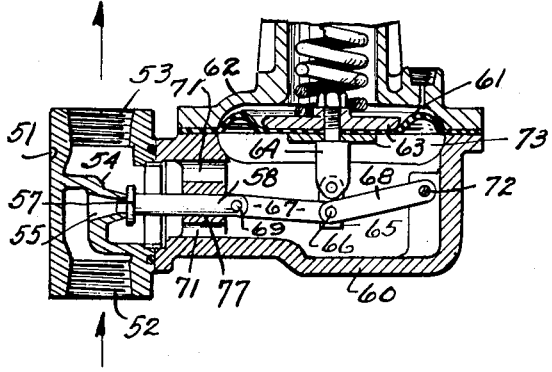
INVENTOR.
GEORGE C. HUGHES
BY
Bates, Teare, y McBean
ATTORNEYS

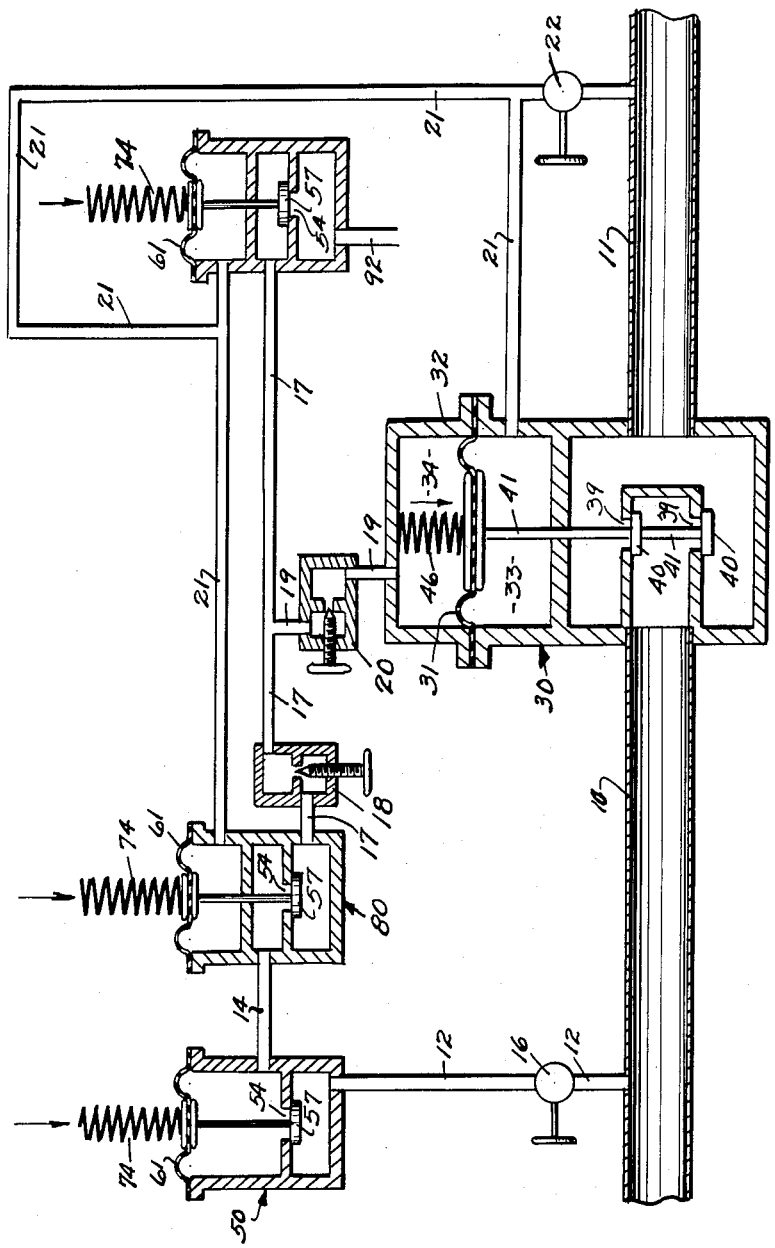

United States Patent Office 2,731,032
Patented Jan. 17, 1956

2,731,032

FLUID PRESSURE REGULATING SYSTEM

George C. Hughes, Anderson, Ind., assignor to Reynolds Gas Regulator Company, Anderson, Ind., a corporation of Indiana Application August 7, 1952, Serial No. 303,107

4 Claims. (Cl. 137—492)

This invention relates to improvements in systems for the distribution of fluids, and especially to a gas distribution system which will maintain, with high degree of accuracy, a predetermined gas pressure in a gas service or low pressure main despite fluctuations in the pressure of gas in a supply or high pressure main and variations in the volume of gas flowing from the high to the low pressure main. This, therefore, is the general object of the present invention.

The invention is particularly concerned with improvements in or relating to the regulation of the flow of gas from a high pressure supply main to a low pressure service main in a gas distribution system where it is desirable to maintain a predetermined low pressure in the service main despite wide variations in the rate of flow of gas through the system, which rate has been found to vary materially at various times of the day. The invention provides an arrangement, by means of which, a demand for an increased volume of gas, or as it is commonly termed an increased "flow demand," will cause the system to automatically adjust itself for the required greater rate of flow, and at the same time maintain the desired predetermined pressure in the service main. This invention provides a gas distribution system which avoids the use of complex arrangements of levers, weights, and the like, as has been customary in the past. Further the invention provides a gas distribution and regulating system wherein the service main pressure may be changed by a simple adjustment. The invention also provides a pressure regulating system having a high regulating capacity relative to its fully opened capacity. These therefore are some of the more specific objects of this invention.

According to the present invention, there is provided an improved gas pressure regulating system wherein a main valve is connected between a high pressure supply main and a low pressure service main to control the flow of gas from one main to the other, the valve being actuated by a pressure responsive diaphragm, having a valve closing chamber on one side and a valve opening chamber on the other side, together with a settable spring acting to bias the diaphragm in a valve opening direction. The valve opening chamber is connected with the outlet of a pilot regulating valve and a pressure relief valve through flow restricting devices. The inlet of the pilot valve is connected with the high pressure main through the medium of an auxiliary high pressure regulator or pressure reducing valve which provides a predetermined outlet pressure. The valve closing chamber of the diaphragm is subjected to the pressure in the low pressure service main, which pressure also controls the pilot regulator and the pressure relief valve. The pilot regulator, the auxiliary regulator, the relief valve all include settable biasing springs which, together with the independently adjustable flow restricting devices, enable the system to be used over a wide range of pressure and flow conditions.

Other objects and advantages of the present invention will become more apparent from the following description of an embodiment thereof illustrated in the accompanying drawings in which:

Fig. 1 is an elevational view of the improved gas pressure distribution system;

Fig. 2 is a vertical section through the main regulator and valve, the lower portion of which has been rotated ninety degrees about a vertical axis from the position shown in Fig. 1 to more clearly illustrate the operation thereof;

Fig. 3 is a vertical section through the auxiliary high pressure regulator, the plane of the section being indicated by the lines 3—3 on Fig. 1;

Fig. 4 is a vertical axial section through the lower portion of the pilot regulator, the plane of the section being indicated by the lines 4—4 on Fig. 1;

Fig. 5 is a fragmentary section through the relief valve, the plane of the section being indicated by the lines 5—5 on Fig. 1; and Fig. 6 is a diagrammatic illustration of the improved distributing and regulating system.

Referring now to the drawings in detail and particularly to Figs. 1 and 6, a high pressure supply main 10 is connected with the inlet of a main control or regulating valve 30, the outlet of which is connected with a low pressure service main 11. The valve 30 includes a valve member 40 which is actuated by a pressure responsive diaphragm 31 mounted in a casing 32 surmounting the valve body 35. An auxiliary high pressure regulator 50 has its inlet connected with the high pressure main 10 by a conduit 12 and its outlet connected by a conduit 14 with the inlet of a pilot regulating valve 80. A shut-off valve 16 is interposed in the conduit 12 between the supply main 10 and the regulator 50.

The outlet of the pilot regulating valve 80 is connected with the inlet of a pressure relief valve 90 by a conduit 17. An adjustable flow restricting unit, such as a needle valve 18, is interposed in this conduit. The pilot regulator 80 is also connected with a chamber 34 above the diaphragm 31 of the main valve 30 by a conduit 19 which extends from such chamber 34 to a point in the conduit 17 between the needle valve 18 and the relief valve 90. A second adjustable flow restricting unit, such as the needle valve 20, is interposed in the conduit 19 to control the rate of flow of gas therethrough.

The service line 11 is connected by conduits 21 with a chamber 33 within the casing 32 below the diaphragm 31, and with the operating mechanisms for the pilot and pressure regulators. A shut-off valve 22 is provided to stop the flow of gas from the service main 11 to these conduits.

In Fig. 2 there is shown one type of main regulating valve which is well adapted for use in the present system. The valve 30, as there shown, comprises a hollow valve body 35 having inlet and outlet openings 36 and 37 to which the supply and service mains 10 and 11 are connected respectively. The inlet 36 is separated from the outlet 37 by a partition wall 38 having a pair of aligned valve port openings 39. The flow of fluid through the valve port openings 39 is controlled by a pair of valve members 40 secured to a rod 41 which extends upward through the upper portion of the valve body 35 into the surmounting casing 32. Packing rings 42 are provided to prevent the seepage of gas from the valve body 35 into the casing 32 along the rod 41.

The casing 32 is separated into upper and lower chambers 34 and 33 respectively by the flexible diaphragm 31. This diaphragm is conveniently positioned between upper and lower casing parts which, when secured together, clamp the periphery of the diaphragm in place. The central portion of the diaphragm 31 is clamped between a pair of discs 43 which are secured to the upper end of the valve rod 41 to transmit movement of the diaphragm to the valve members 40. The conduits 17 which connect the pilot and relief regulating valves with the main diaphragm chamber 34 may be connected to opposite ends of a suitable pipe T 23 (Fig. 1), the other end of which is connected by a short conduit (not shown) with a threaded inlet opening 45 (Fig. 2) of the diaphragm chamber 34. Similarly the conduit 17 which connects the low pressure service line 11 with the chamber 33 and the operating mechanism of the relief valve 90 and the pilot valve 80 may be connected by a pipe T 25 with a threaded inlet opening 44 formed in the wall of the chamber 33.

The main diaphragm 31 is preloaded by an adjustable spring 46 mounted within upwardly extending tubular portion 47 of the casing 32. This spring is interposed between the diaphragm 31 and a washer 48 which is movable vertically in the extension 47. An adjusting screw 49 is threadingly mounted in the upper end of the extension 47 and adjustably engages the washer 48 to control the pressure of the spring on the diaphragm.

A regulator suitable for use as an auxiliary high pressure regulator is illustrated in Fig. 3. Such regulator comprising a body 51 having an inlet 52 and an outlet 53 separated by a partition wall 54 having a valve port opening 55. The flow of gas through the port 55 is controlled by a valve member 57 secured to one end of a rod 58 which is slidably mounted in a regulator body 60 for movement to and from the port. The regulator body 60 is secured to the valve body by any well known means. As shown in Fig. 3, the valve body 51 has been rotated approximately ninety degrees about a horizontal axis from the position shown in Fig. 1. The regulator body 60 extends some distance to the right of the valve body 51 and provides an enlarged housing, the upper end of which is closed by a diaphragm 61, held in place by a hollow cap-like structure 62. The central portion of the diaphragm 61 is clamped between two rigid discs 63, one of which has a downwardly extending arm 64. This arm is connected by a link 65 with a pivot pin 66 which interconnects a pair of toggle-like links 67 and 68. The link 67 is connected between the pivot 66 and a pivot 69 formed on the inner end of the valve 58. The link 68 is connected between the pivot 66 and a fixed pivot 72 carried by the body 60. These pivotal connections are so arranged that upward movement of the diaphragm, in response to gas pressure exerted on its under side, will move the valve member 57 toward the valve port opening 55 to close the same. Suitable communicating passageways 71 place the chamber 73 below the diaphragm 61 in communication with the pressure at the outlet side of the valve. The diaphragm 61 is biased by a spring 74 housed in an upwardly extending portion 76 of the cap 62. This spring extends between a washer 78 in the upper portion of the body 60 and the upper diaphragm supporting disc 63, and tends to move the valve 57 away from its port 55 to permit the passage of gas therethrough. An adjusting screw 75 is mounted in the upper end of the extension 76 and serves to adjust the pressure of the spring 74 on the diaphragm 61.

The pilot regulating valve 80 is similar in construction to that of the auxiliary regulator 50. A suitable pilot valve is illustrated in Fig. 4. Most of the elements of this valve are identical with those shown in Fig. 3 and have been given the same identification. The structure shown in Fig. 3 differs from that shown in Fig. 4 in that the chamber 73 below the diaphragm 61 of Fig. 4, is closed to both the inlet and outlet pressure of the valve by the wall 77, whereas in the structure shown in Fig. 3, the corresponding wall 77 is provided with passageways 71 which interconnect the chamber 73 with the valve outlet 53. Any flow or seepage of gas along the valve rod 58 of the pilot valve 80 (Fig. 4) is prevented by an annular ring 82 of rubber-like material, substantially circular in section, which is positioned in a recess formed in the outer wall of the valve rod 58. This ring snugly engages both the rod 58 and the wall of the guideway 83 through which the rod passes. In the pilot valve, gas pressure is applied to the chamber 73 below the diaphragm 61 through an inlet opening 84 which is shown in Fig. 1 as being connected to the low pressure conduit 21.

The inlet and outlet pressures of the pilot regulator 80, due to the construction of the regulator and the relatively small pressure differential between the pilot inlet and outlet, has substantially no effect upon the position of the pilot valve member 57. The position of this valve member is controlled by the position of its diaphragm 61. Gas pressure beneath the pilot diaphragm 61 tends to move the pilot valve member 57 toward its port 55, and the downward pressure of the spring 74 tends to move such valve member 57 away from its seat.

The structure of the pressure relief valve 90 is substantially the same as that of the pilot regulator 80. The only substantial difference between these structures is apparent from Fig. 5. In the relief valve 90 the stationary pivot 72 of the toggle link 68 is below the pivotal connection 66 between the toggle links, whereas in the pilot valve (Fig. 4) the stationary pivot is above the pivot 66. Like the pilot valve the inlet and outlet pressures, for all practical purposes, have no effect on the flow of gas through the valve port 55 of the relief valve.

The difference between the operation of the pilot regulator 80 and the operation of the relief valve 90 is that the force of gas pressure beneath the diaphragm 61 of the relief valve tends to move the valve member 57 away from its port 55 and the force of the biasing spring 74 tends to move the valve member toward such port. This is directly the reverse of the operation of such forces in the pilot valve 80 of Fig. 4.

The improved gas distribution and regulation system is well adapted for use for service main pressures from ten to one hundred pounds and high or supply main pressures from one hundred and twenty-five to two hundred pounds.

A typical condition is one where inlet gas pressures vary from one hundred to fifty pounds and the desired outlet pressure is ten pounds. Under such conditions the spring 46 of the main regulator 30 is adjusted to exert a pressure against its diaphragm 31, when the valve members 40 are seated, equivalent to a pressure of two pounds per square inch over the entire area of the diaphragm 31. The spring is selected so that when the valve members 40 are wide open the spring still exerts some pressure against the diaphragm, for instance, four ounces per square inch. The high pressure auxiliary regulator 50 is adjusted, by its spring adjusting screw 75, to maintain an outlet gas pressure of ten pounds per square inch (p. s. i.). The pilot regulator 80 is set to maintain an outlet pressure of eight p. s. i. when the gas pressure under its diaphragm 61 is equal to ten p. s. i., and the relief valve is set to remain closed as long as the gas pressure beneath its diaphragm is ten p. s. i. or less and to open to vent the conduit 21 to atmosphere, through a discharge conduit 92, when such pressure exceeds ten p. s. i. As long as the pressure in the service main is ten p. s. i., there will be no flow of gas through the auxiliary system including the regulators 50, 80 and 90. At this time the downward force on the diaphragm 31 of the main valve 30 is then p. s. i. (eight pounds gas pressure plus two pounds spring pressure). This force is counter-balanced by a force of ten p. s. i. upward pressure in the chamber 33 below the main diaphragm, this pressure being supplied by the low pressure service main 11. The result is a balance in pressures on opposite sides of the diaphragm 36.

In operation, the lowering of the pressure in the low pressure service main 11, for instance by one pound, as caused by a demand for gas will immediately cause the pressure below the diaphragm 31 of the main pressure regulator 30, and the pressure below the diaphragm 61 of the pilot and relief valves to drop. This drop in pressure has no effect on the relief valve 90 and it remains closed. However the reduction in pressure in the chamber below the main diaphragm 31 causes the main valve 40 to move away from its seat permitting a greater volume of gas to flow to the service main 11. The reduction in pressure below the diaphragm 61 of the pilot valve causes this valve to open under impulse of its spring 74 to increase its outlet pressure to a point between eight and ten p. s. i. This of course tends to further increase the pressure above the main diaphragm 31 and accelerate the opening of its valve 40. This acceleration is retarded by the joint action of the needle valves 18 and 20 which restrict the flow of gas to the diaphragm chamber 34.

The setting of the needle valves 18 and 21 is such that the increase in pressure supplied at the outlet of the pilot regulator 30 has substantially no effect on the pressure in the diaphragm chamber 34 if the increased flow through the valve ports 39 quickly restores the service main pressure to ten p. s. i. however should such restoration be delayed, the pressure in the chamber 34 will increase causing the valve 40 to open wider and provide for the increased flow demand, and as soon as the demand is satisfied the pressures on the diaphragm 31 will be restored to their normal balanced condition and the valves 40 will remain open to provide for the required flow to the service main 11.

When the demand for gas at the service main 11 decreases, the pressure in such main rises. This causes an increase in pressure below the diaphragms 61 of the pilot and relief valves 80 and 90, as well as below the main diaphragm 31. This increase in the pilot regulator causes its valve 57 to close, shutting off the supply of gas to the chamber 34 of the main valve. The increase in chamber 33 of the main diaphragm throws the pressures thereon out of balance and the main valves 40 move toward their respective valve ports 39. The increase of pressure in the relief valve to a point above the desired ten p. s. i. causes this valve to open the conduits 17 to atmosphere. Due to the needle valve 20, the opening of the relief valve 90 has substantially no effect on the main diaphragm 31 if the pressure in the service main 11 quickly drops to the desired ten p. s. i. However should this drop in pressure be delayed the pressure in the chamber 34 will vent to atmosphere through the relief valve 90 thus increasing the pressure differential on the main diaphragm 31 and accelerating the closing movement of the main valves 40 to provide for the decreased flow demand. As soon as the decrease is provided for the pressures return to normal and the main valve assumes the position necessary to provide for the required flow demand.

The needle valve 20 controls the time interval between an increase of pressure in the service main 11 and the acceleration of the closing of the main valve 30 in response to the opening of the relief valve. Likewise the conjoint action of the needle valves 18 and 20 controls the time interval between a decrease of pressure in the service main 11 and the acceleration of the opening movement of the main valve 31 in response to the opening of the pilot regulator 30. As the needle valves are adjustable these time periods may be regulated as desired.

When it is desired to use the system for a different service main pressure the springs 74 of the pilot and relief valves and the spring 46 of the main valve are reset to compensate for the required pressure changes. If the change is great the auxiliary regulator 50 may be similarly reset to provide an increased pressure supply to the pilot regulator. The needle valves 18 and 20 are reset for the desired time delays for acceleration of the movement of the main valve 31. To facilitate adjustment of the system suitable pressure guages (not shown) may be inserted in the conduits 12, 14, 17 and 21 in the well known manner.

The shut-off valves 16 and 22 are normally wide open. However, should it be desired to take the system out of operation it is only necessary that these two valves be closed entirely. The adjustment of the system need not be changed when the system is again placed in operation.

When using the improved system the diaphragm 31 may be of the same diameter for any outlet or service main pressure from say forty to one hundred pounds. The system entirely avoids the use of levers, weight, etc., and is extremely simple to adjust. Further, the system is responsive to relatively small changes in pressure in the service main 11. While it has been described in connection with a one pound change, it will be understood that this is for ease of description only, as the system is equally responsive to smaller or greater changes. Further, due to the acceleration of the main valve and the control of such acceleration great changes are rapidly compensated for. Further, when the pressure differential between the supply main 10 and the service main 11 is relatively small, for instance ten p. s. i., the auxiliary high pressure regulator 50 may be omitted and the conduit 12 connected directly with the inlet of the pilot regulator 80.

I claim:

1. In a system for regulating the flow of gas from a high pressure main to a low pressure main, a diaphragm operated valve interposed between said mains to control the flow of fluid from one main to the other, a pilot pressure regulator responsive to pressure in the low pressure main and having an inlet and an outlet, a high pressure auxiliary pressure regulator having an inlet connected with the high pressure main and an outlet normally set for a predetermined outlet pressure and connected with said pilot regulator inlet, a relief valve having an inlet and an exhaust outlet, a conduit connecting said relief inlet with the outlet of the pilot regulator, said relief valve being responsive to the pressure in the low pressure main and set to open when such pressure exceeds a predetermined maximum, a valve closing chamber below the diaphragm of the main valve and a valve opening chamber above said diaphragm, the valve opening chamber being connected to said conduit between the inlet of the relief valve and the outlet of the pilot regulator, a manually settable needle valve between the outlet of the pilot regulator and said opening chamber, a second manually settable needle valve between said chamber and the relief valve, a substantially unrestricted passageway between the closing chamber and the low pressure main said passageway being the only external fluid communication with said valve closing chamber, and a manually settable adjustable spring in the opening chamber and acting on said diaphragm to bias move the main valve to an open position.

2. In a system for regulating the flow of gas from a high pressure main to a low pressure main, a valve interposed between said mains to control the flow of gas from one main to the other, a pressure responsive diaphragm to open and close said valve, a valve closing chamber at one side of the diaphragm, a valve opening chamber at the other side of said diaphragm, means including a pilot pressure regulator and connected with the high pressure line to deliver gas at a predetermined pressure lower than the desired pressure in the low pressure main to the valve opening chamber, means responsive to a decrease of pressure in the low pressure main to increase said predetermined pressure in the opening chamber, means to retard the action of said increased pressure on said diaphragm, means to cause the escape of such pressure when the pressure in the low pressure main rises, means to retard said escape, a spring in said valve opening chamber and acting on said diaphragm in a direction to cause the diaphragm to move the main valve to an open position, and a gas conduit between said valve closing chamber and the low pressure main to apply the low pressure to said diaphragm.

3. In a system for controlling the flow of gas from a high pressure supply main to a low pressure service main, a main valve disposed between said mains, an auxiliary system through which a limited volume of gas may flow from the supply, said auxiliary system including a diaphragm actuated gas pressure regulator having an inlet connected to the high pressure main and an outlet, said regulator being settable to deliver gas at a predetermined pressure, a second diaphragm operated gas pressure regulator having an inlet connected with the outlet of the first named regulator and an outlet, said second regulator being responsive to the pressure in the service main to increase its outlet pressure as the service pressure decreases and to decrease its outlet pressure whenever the pressure in the service main rises, said first named regulator having an actuating diaphragm responsive to the pressures at its outlet, said second named regulator having an actuating diaphragm responsive to the pressure in the service main, and an adjustable biasing spring for each regulator, a third pressure responsive diaphragm, an actuating connection between said third diaphragm and the main valve, a valve closing chamber at one side and a valve opening chamber on the other side of said third diaphragm, a substantially unobstructed passageway between said closing chamber and the service main, said passageway being the sole fluid communication with said closing chamber, a spring in said opening chamber and acting on said diaphragm in a direction to open said main valve, a passageway between the valve opening chamber and the outlet of said second named regulator, manually settable means to restrict the flow of gas through said passageway, a pressure relief valve having an inlet connected with the valve opening chamber and an outlet open to atmosphere, and a diaphragm to actuate said relief valve, said diaphragm being responsive to the service main pressure, and settable to open the relief valve to relieve the pressure in the valve opening chamber only when the pressure in the service main rises above the desired service main pressure whereby no gas flows through the auxiliary system as long as the pressure in the service main is at or below the desired service main pressure.

4. In a fluid pressure regulating system having a high pressure main and a low pressure main, a main pressure regulating valve interposed between said mains for controlling the flow of fluid from the high pressure main to the low pressure main and including a pressure responsive diaphragm to open and close said valve, there being a valve opening chamber on one side of said diaphragm and a valve closing chamber on the other side, resilient means biasing said diaphragm in a valve opening position, an unrestricted passageway connecting said closing chamber directly with the low pressure main, said passageway being the only access to said chamber whereby the closing movement of said diaphragm is directly responsive to the pressure in the low pressure main, a pilot pressure regulating system to control the pressure in the valve opening chamber, said pilot system including an auxiliary pressure responsive valve, a pressure responsive pilot valve and a pressure responsive relief valve, each of said last named valves having an inlet and an outlet, valve members to control the flow of fluid through respective valves, means biasing the relief valve to a closed position, the inlet and outlet of the auxiliary valve being connected with the high pressure main and the pilot valve inlet respectively, the inlet and outlet of the relief valve being conected with the pilot outlet and a point of exhaust respectively, a passageway connecting the outlet of the pilot valve with the main valve opening chamber, manually settable means to control the rate of flow of fluid between the pilot valve the valve opening chamber and said relief valve, and means responsive to the outlet pressure of the auxiliary valve to control its valve member, and means responsive to the pressure in the low pressure main to close the pilot valve and open the relief valve only when the pressure in the low pressure main rises above the desired low pressure, whereby no fluid flows through the auxiliary system as long as the pressure in the low pressure main is at or below the desired low pressure.

References Cited in the file of this patent

UNITED STATES PATENTS

| | | |
|---|---|---|
| 843,174 | Reynolds | Feb. 5, 1907 |
| 1,139,533 | Kitchen | May 18, 1915 |
| 1,189,349 | Cross | July 4, 1916 |
| 1,611,079 | Roschanek | Dec. 14, 1926 |
| 1,839,547 | Gaunt | Jan. 5, 1932 |
| 1,883,690 | Gilgenberg | Oct. 18, 1932 |
| 2,057,133 | Bryce | Oct. 13, 1936 |
| 2,309,848 | King | Feb. 2, 1943 |
| 2,323,839 | Nixon | July 6, 1943 |
| 2,365,713 | McLean | Dec. 26, 1944 |
| 2,370,110 | Spence | Feb. 20, 1945 |
| 2,543,846 | Griswold | Mar. 6, 1951 |